3,336,348
REACTION BETWEEN CERTAIN β-LACTONES AND CERTAIN PHOSPHITES AND PRODUCTS OBTAINED THEREBY
Edward U. Elam and Joseph B. Dickey, Kingsport, Tenn., assignors to Eastman Kodak Company, Rochester, N.Y., a corporation of New Jersey
No Drawing. Filed Nov. 4, 1963, Ser. No. 321,341
19 Claims. (Cl. 260—403)

The invention relates to organic phosphorous compounds of the general formula

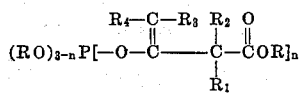

in which R is an organic radical derived from an organic phosphite and represents an alkyl group of from 1 to 8 carbon atoms, straight or branch-chained such as methyl, ethyl, hexyl and octyl, or R represents a benzene radical such as phenyl and substituted phenyl such as chlorophenyl; each pair of the groups $R_1$, $R_2$ and $R_3$, $R_4$ represents the same or different alkyl groups of from 1 to 8 carbon atoms or each pair represents an alkylene group —$(CH_2)_4$— or —$(CH_2)_5$— which together with the carbon atom to which it is attached forms a saturated carbocyclic ring of from 5 to 6 carbon atoms. Thus, each of the four alkyl groups can be methyl or ethyl, or $R_1$ and $R_2$ can be ethyl and butyl respectively when $R_3$ and $R_4$ are ethyl and butyl respectively, or when taken together can form a five-membered ring or a six-membered ring. $n$ is a positive integer of from 1 to 3.

The phosphorous compounds are prepared by reaction of phosphites with β-lactones according to the following general equation

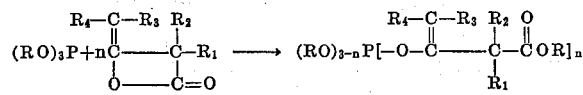

Accordingly, when $n=1$, 2 or 3 the compounds have the respective formulas (I) 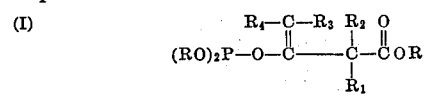

(II) 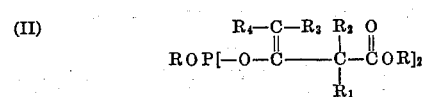

(III) 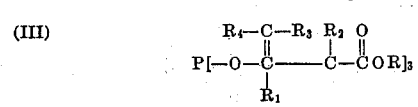

in which the R groups have the meaning given above.

The reaction of β-propiolactone with triethyl phosphite has been reported [McConnell and Coover, J. Am. Chem. Soc., 78, 4453 (1956)]. In this reaction, alkyl-oxygen cleavage of the β-lactone ring occurs and the overall reaction is represented by the equation:

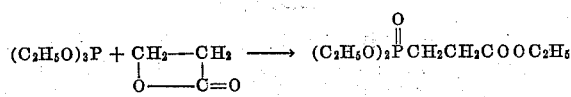

The product of this reaction, ethyl 3-diethylphosphonopropionate, contains pentavalent phosphorous and a phosphorous-carbon bond.

Since starting materials of the process of our invention are also β-lactones it was unexpected that the product contained trivalent phosphorous and no phosphorous-carbon bonds, apparently due to the presence of the double bond attached directly to the lactone ring. The chemical behavior of the compounds of our invention is quite different from the product obtained with β-propiolactone.

The phosphites above of formula $(RO)_3P$ useful in preparing the phosphorous compounds of the invention are, for example, aliphatic phosphites such as trimethyl-, triethyl-, tripropyl-, tributyl-, tri-isobutyl-, trihexyl-, triheptyl- and trioctyl phosphites, and aromatic phosphites such as triphenyl phosphite and trichlorophenyl phosphite.

The reactions of the β-lactones with the phosphites according to the above general equation can be carried out by heating these reactants, preferably in an inert atmosphere such as nitrogen, and recovering the product by the usual distillation methods. The conditions under which this reaction is run are not critical. In general, temperatures from 25° C. to 250° C., and preferably from 150° C. to 225° C. may be used. The exact temperature will depend upon the nature, and particularly on the molecular weight, of the reactants, lower molecular weight compounds generally reacting at lower temperature than high molecular weight ones. The molar proportions of reactants used are not critical. In general, compounds of Formula I above are obtainable by using an excess of the phosphite. More of compounds of Formulas II and III are obtainable by use of an excess of the β-lactone.

The phosphorous compounds of the invention are especially useful as chemical intermediates, e.g. they undergo hydrolysis to yield the corresponding phospite and esters. Hydroxyketones are obtained by reduction of the compounds. They can be used in the preparation of useful insecticides, plasticizers for synthetic polymers and lubricants.

The following examples are illustrative of the processes and products of our invention.

*Example 1*

A mixture of 280 g. (2 moles) of 3-hydroxy-2,2,4-trimethyl-3-pentenoic acid β-lactone and 332 g. (2 moles) of triethyl phosphite was heated in a nitrogen atmosphere for fifteen hours. The temperature of the refluxing liquid rose from 165° C. to 190° C. in about five hours; an automatic controller was used to prevent the temperature of the mixture from exceeding 190° C. The product was distilled under nitrogen giving 107 g. of low-boilers (unconverted starting materials), 269 g. of crude ethyl 3-(diethoxyphosphinooxy) - 2,2,4 - trimethyl - 3 - pentenoate, B.P. 105–19° C. (1.5–2 mm.), $n_D^{20}$ 1.4558, and 178 g. of higher boiling material. Redistillation of the main fraction gave a purified sample, B.P. 91–6° C. (0.5 mm.), $n_D^{20}$ 1.4541.

*Analysis.*—Calcd. for $C_{14}H_{29}O_5P$: C, 54.5; H, 9.4; P, 10.4; mol. wt., 308. Found: C, 54.4; H, 8.9; P, 10.0; mol. wt. (B.P. elevation in benzene), 264.

This compound reacted exothermically with cuprous chloride, a reaction characteristic of derivatives of trivalent phosphorous. Reduction with lithium aluminium hydride gave 1 - hydroxy - 2,2,4 - trimethyl - 3 - pentanone. These reactions establish that the product has the structure

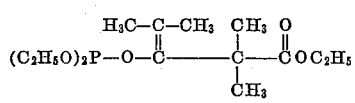

and is not the isomeric compound

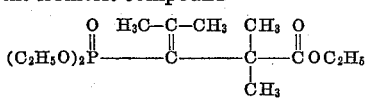

which would be expected from analogy with the reaction between β-propiolactone and triethyl phosphite.

Redistillation of the combined high-boilers from several experiments gave a fraction, B.P. 125° C. (1.3 mm.), $n_D^{20}$ 1.4520, which was

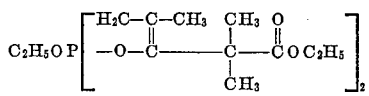

*Analysis.*—Calcd. for $C_{22}H_{39}O_7P$: C, 59.2; H, 8.9; P, 7.0. Found: C, 58.2; H, 8.9; P, 7.0.

Example II

A mixture of 250 g. (1 mole) of tributyl phosphite and 140 g. (1 mole) of 3-hydroxy-2,2,4-trimethyl-3-pentenoic acid β-lactone was heated overnight to 210° C. in a nitrogen atmosphere. Distillation of the product gave butyl 3-(dibutoxyphosphinooxy)-2,2,4-trimethyl - 3 - pentenoate, B.P. 165–71° C. (1.8 mm.), $n_D^{20}$ 1.4575.

*Analysis.*—Calcd. for $C_{20}H_{39}O_5P$: C, 61.5; H, 10.0; P, 8.0; mol. wt., 390. Found: C, 60.9; H, 9.9; P, 8.3; mol. wt. (B.P. elevation in benzene), 379.

Example III

The procedure of Example I was repeated with trimethyl phosphite and 2-butyl-2,4-diethyl-3-hydroxy - 3-octenoic acid β-lactone. Methyl 3-(dimethoxyphosphinooxy)-2-butyl-2,4-diethyl-3-octenoate, B.P. 165–75° C. (1.8 mm.) was obtained.

Example IV

Triphenyl phosphite (62 g.) and 3-hydroxy-2,2,4-trimethyl-3-pentenoic acid β-lactone (28 g.) were heated to 210° C. for three days. After removal of unconverted starting material by distillation, phenyl 3-(diphenoxyphosphinooxy)-2,2,4-trimethyl-3 - pentenoate remained as a viscous oil.

Example V

The process of ExampleI was carried out using trimethyl phosphite in place of triethyl phosphite. The product has the formula

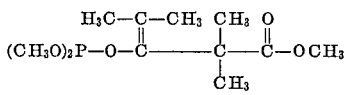

Example VI

The process of Example I was carried out using trioctyl phosphite in place of triethyl phosphite to obtain octyl 3-(dioctoxyphosphinooxy)-2,2,4-trimethyl - 3 - pentenoate.

In the manner of the above examples other compounds having Formulas I, II or III above can be obtained by reacting the phosphites of formula $(RO)_3P$, e.g. dimethyl- and diethyl phosphites, with other β-lactones such as 3-hydroxy-2-octyl-2,4-dimethyl-3-lauric acid β-lactone, 3-hydroxy-2-ethyl-2,4-dihexyl-3-capric acid β-lactone, 3 - hydroxy-2,2,4-trihexyl-3-capric acid β-lactone and 3-hydroxy-2-cyclohexyl-2-methyl - 3 - cyclohexyl butenoic acid β-lactone.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Compounds having the general formula

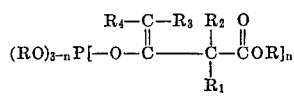

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 to 6 carbon atoms, and $n$ represents a positive integer of from 1 to 3.

2. Compounds having the general formula

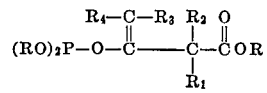

wherein R, $R_1$, $R_2$, $R_3$ and $R_4$ each represent alkyl of 1 to 8 carbon atoms.

3. Compounds having the general formula

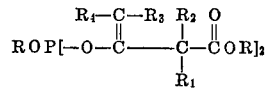

wherein R, $R_1$, $R_2$, $R_3$ and $R_4$ each represent alkyl of 1 to 8 carbon atoms.

4. Compounds having the general formula

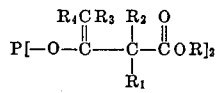

wherein R, $R_1$, $R_2$, $R_3$ and $R_4$ each represent alkyl of 1 to 8 carbon atoms.

5. The compound of the formula

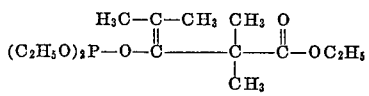

6. The compound of the formula

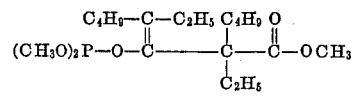

7. The compound of the formula

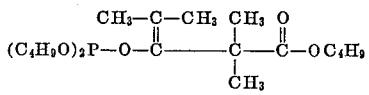

8. The compound of the formula

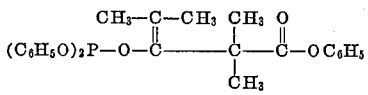

9. The compound of the formula

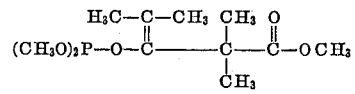

10. A process for preparing esters of phosphorous acid having the general formula

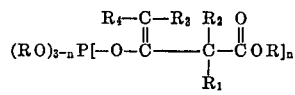

which comprises heating in the presence of a phosphite having the general formula $(RO)_3P$, a lactone having the general formula

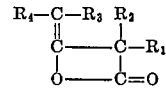

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 to 6 carbon atoms, and $n$ represents a positive integer of from 1 to 3.

11. The process of claim 10 wherein an excess of phosphite is used.

12. The process of claim 10 wherein an excess of the lactone is used.

13. A process for preparing esters of phosphorous acid having the general formula

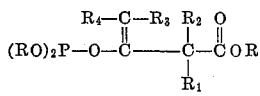

which comprises heating in the presence of a phosphite having the general formula $(RO)_3P$, a lactone having the general formula

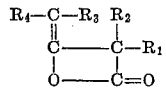

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 and 6 carbon atoms.

14. A process for preparing esters of phosphorous acid having the general formula

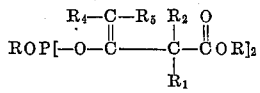

which comprises heating in the presence of a phosphite having a general formula $(RO)_3P$, a lactone having the general formula

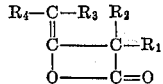

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 to 6 carbon atoms.

15. A process for preparing ethyl 3-(diethoxyphosphinooxy)-2,2,4-trimethyl-3-pentenoate which comprises heating 3-hydroxy-2,2,4-trimethyl-3-pentenoic acid β-lactone in the presence of triethyl phosphite.

16. A process for preparing methyl 3-(dimethoxyphosphinooxy)-2-butyl-2,4-diethyl-3-octenoate which comprises heating 2-butyl-2,4-diethyl-3-hydroxy-3-octenoic acid β-lactone in the presence of trimethyl phosphite.

17. A process for preparing butyl 3-(dibutoxyphosphinooxy)-2,2,4-trimethyl-3-pentenoate which comprises heating 3-hydroxy-2,2,4-trimethyl-3-pentenoic acid β-lactone in the presence of tributyl phosphite.

18. A process for preparing phenyl 3-(diphenoxyphosphinooxy)-2,2,4-trimethyl-3-pentenoate which comprises heating 3-hydroxy-2,2,4-trimethyl-3-pentenoic acid β-lactone in the presence of triphenyl phosphite.

19. A process for preparing methyl 3-(dimethoxyphosphinooxy)-2,2,4-trimethyl-3-pentenoate which comprises heating 3-hydroxy-2,2,4-trimethyl-3-pentenoic acid β-lactone in the presence of trimethyl phosphite.

No references cited.

ALEX MAZEL, *Primary Examiner.*

BERNARD BILLIAN, JOSEPH A. NARCAVAGE,
*Assistant Examiners.*

UNITED STATES PATENT OFFICE
CERTIFICATE OF CORRECTION

Patent No. 3,336,348                                         August 15, 1967

Edward U. Elam et al.

It is hereby certified that error appears in the above numbered patent requiring correction and that the said Letters Patent should read as corrected below.

Column 1, lines 50 to 55, the formula should appear as shown below instead of as in the patent:

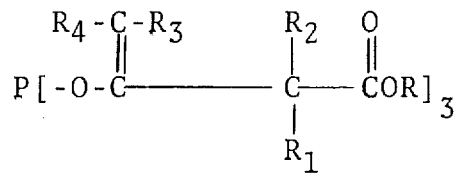

column 4, lines 20 to 23, the formula should appear as shown below instead of as in the patent:

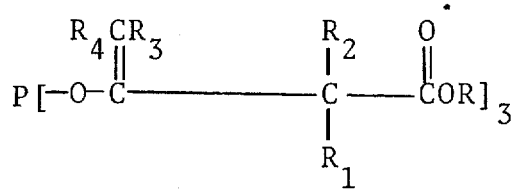

Signed and sealed this 19th day of November 1968.

(SEAL)
Attest:

EDWARD M. FLETCHER, JR.                        EDWARD J. BRENNER
Attesting Officer                                 Commissioner of Patents